(12) United States Patent
Tomlinson (10) Patent No.: US 6,329,613 B1
(45) Date of Patent: Dec. 11, 2001

(54) PORTABLE CONVEYOR BELT SCALE

(76) Inventor: Bryan Tomlinson, 686 Edenderry Line, Ennismore, Ontario (CA), K0L 1T0

( * ) Notice: Subject to any disclaimer, the term of this patent is extended or adjusted under 35 U.S.C. 154(b) by 0 days.

(21) Appl. No.: 09/390,705

(22) Filed: Sep. 7, 1999

(51) Int. Cl.$^7$ .............................................. G01G 19/00
(52) U.S. Cl. .......................................................... 177/145
(58) Field of Search ............................... 177/16, 119, 145

(56) References Cited

U.S. PATENT DOCUMENTS

| | | | |
|---|---|---|---|
| 3,786,951 | * 1/1974 | Ruff et al. | 214/512 |
| 3,869,007 | * 3/1975 | Haggstrom et al. | 177/211 |
| 3,885,813 | * 5/1975 | Kern | 280/150.5 |
| 4,141,442 | 2/1979 | Cole et al. | 198/429 |
| 4,463,816 | * 8/1984 | MacFarlane | 177/119 |
| 4,788,930 | * 12/1988 | Matteau et al. | 177/16 |
| 5,170,857 | * 12/1992 | Phillips et al. | 177/145 |
| 5,296,654 | 3/1994 | Farley et al. | 177/145 |
| 5,300,736 | 4/1994 | Ehrhardt | 177/145 |
| 5,340,950 | * 8/1994 | Brandorff et al. | 177/145 |
| 5,393,937 | * 2/1995 | Etherington et al. | 177/145 |
| 5,408,054 | * 4/1995 | Brandorff et al. | 177/145 |
| 5,547,034 | 8/1996 | Wurz et al. | 177/25.13 |
| 5,567,919 | * 10/1996 | Cote | 177/119 |
| 5,624,183 | * 4/1997 | Schuff | 366/20 |
| 5,689,092 | 11/1997 | Wurz et al. | 177/145 |
| 5,696,354 | 12/1997 | Linville, Jr. et al. | 177/119 |
| 5,736,682 | * 4/1998 | Heitmann et al. | 177/16 |
| 5,747,747 | 5/1998 | Cadou et al. | 177/145 |
| 5,866,855 | 2/1999 | Nachtigal | 177/145 |
| 5,877,456 | 3/1999 | Homer, III et al. | 177/50 |
| 5,880,407 | * 3/1999 | Flammang | 177/119 |
| 5,959,257 | * 9/1999 | Campbell et al. | 177/16 |

* cited by examiner

*Primary Examiner*—Randy W. Gibson
(74) *Attorney, Agent, or Firm*—Santosh K. Chari; Orange & Chari (57) ABSTRACT

A conveyor system for accurate weighing of a material where all system components are integrated as a single unit and are mounted on either a first or a second frame portion. A trailer hitch and a pair of wheels mounted on the first frame portion provide a portability feature of the conveyor system. The conveyor system consists of the first portion of the frame adjustable to a true horizontal orientation and the second frame portion is inclined at a predetermined angle relative to the first frame portion. A continuous conveyor belt is disposed around the second frame portion and is supported by a series of support roller assemblies on the upper portion of the belt, and by a series of return rollers on the lower portion of the belt. The upper and lower portions of the conveyor belt travel in opposite directions with respect to one another around the second frame portion during operation of the conveyor system. A hydraulic drive system is mounted on the first frame portion. A drive pulley, driven by a hydraulic motor, is located at a discharge end of the second frame portion and an idler pulley is located at an inlet end thereof. A weigh station consisting of a pair of weigh rollers and a pair of corresponding weigh scales is positioned on the second frame portion between the discharge and the inlet ends.

13 Claims, 11 Drawing Sheets

PORTABLE CONVEYOR BELT SCALE

BACKGROUND OF THE INVENTION

1. Field of the Invention

The present invention relates to a conveyor system which provides an accurate and reproducible weight measurement of a material transported by a continuous conveyor belt.

2. Description of the Prior Art

There is a current need for measuring the weight of a material being transported on continuous conveyor belts. When the transported material is of a granular nature, such as grain, ore, coal and crushed aggregate etc., a belt speed, a flow rate of the conveyed material, a tension of the belt, an orientation of the weigh rollers, and an angle of the conveyor belt with respect to a level plane are all important factors in affecting the accuracy and reliability of weight measurement of the material. The disadvantage of present conveyor belt weighing systems is that they must be recertified whenever they are moved to another job site.

SUMMARY OF THE INVENTION

In one aspect of the invention, there is provided a conveyor system for continuous conveying and accurate weighing of a bulk material. The conveyor system comprises a frame, at least one continuous conveyor belt positioned on the frame including an upper portion and a lower portion moving in opposite directions. A drive system is mounted on the frame to rotate the belt, and a plurality of frame rests are mounted on the frame to support the frame relative to a ground surface. The frame includes a first portion and a second portion. Said frame second portion includes a support frame. A plurality of support roller assemblies and a plurality of return rollers are transversely situated on the support frame in a spaced apart parallel relationship. A weight station is located between a pair of the support roller assemblies, between an inlet end and a discharge end. A drive pulley is located at one of the ends and an idler pulley is located at an opposite ends. The first portion of the frame includes a generally planar base, a plurality of frame supports projecting substantially upwards from the base and connected to the second portion of the frame. The conveyor belt is disposed about the support roller assemblies, the weigh station, the idler pulley, the drive pulley, and the return rollers. All of the components of the conveyor system are integrated as a single unit and the conveyor system is thereby portable.

In a preferred embodiment, the second portion of the frame is inclined at a predetermined fixed angle relative to the first portion of the frame. A series of adjustable jacks are attached to the first portion to facilitate a true horizontal positioning thereof. A pair of wheels and a trailer hitch are mounted on the first portion of the frame to facilitate mobility and transport of the conveyor system.

In a further aspect of the invention, the conveyor system may be used as a second link between a device to crush aggregate material and a stacker, whereby the crushed material may be piled in a substantially 360° arc around the crusher.

BRIEF DESCRIPTION OF THE DRAWINGS

These and other features of the preferred embodiments of the invention will become more apparent in the following detailed description, in which reference is made to the appended drawings by way of example only.

DESCRIPTION OF THE PREFERRED EMBODIMENTS

Figure 1:
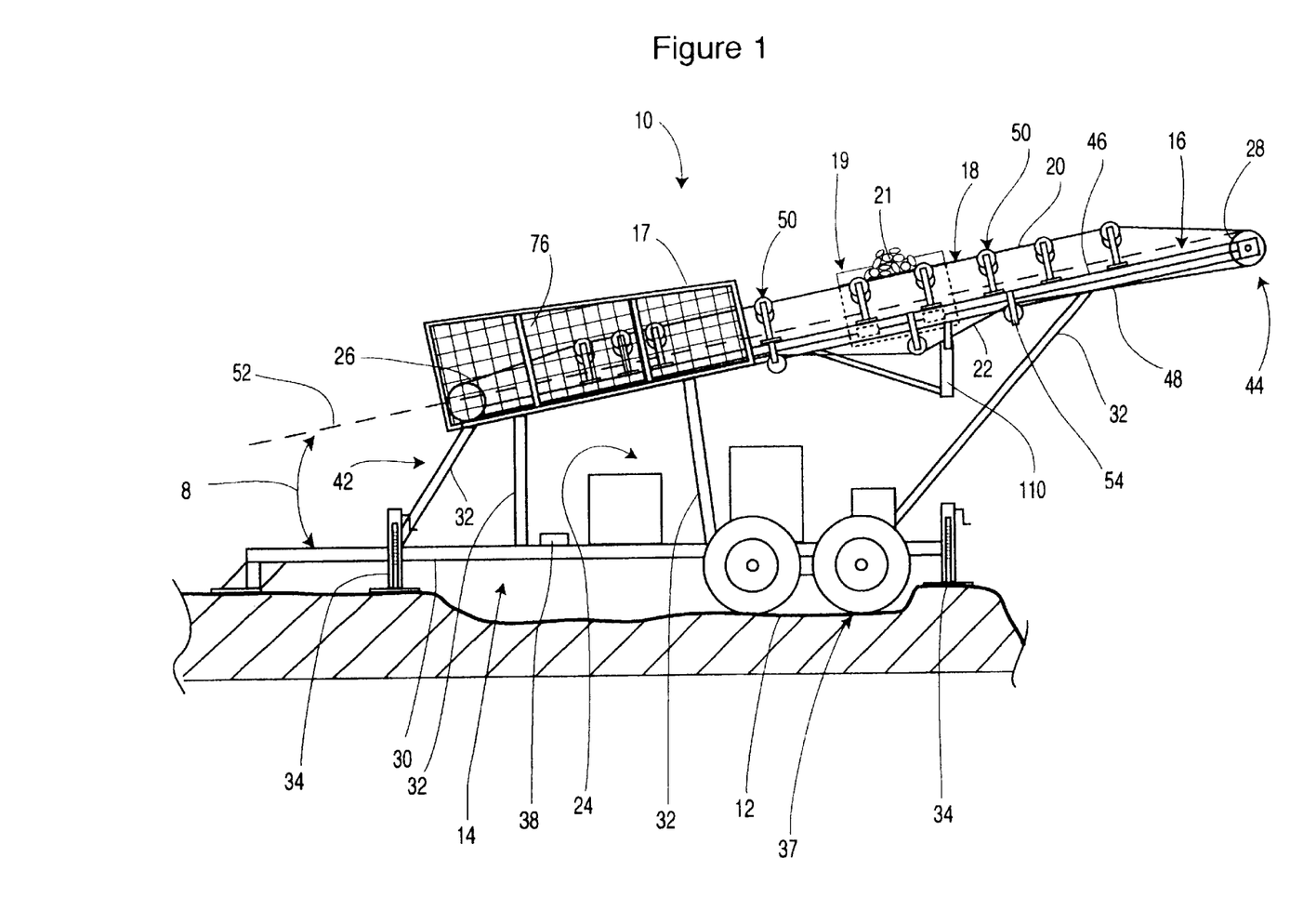
FIG. 1 is a side elevation of a conveyor system.
Figure 2:
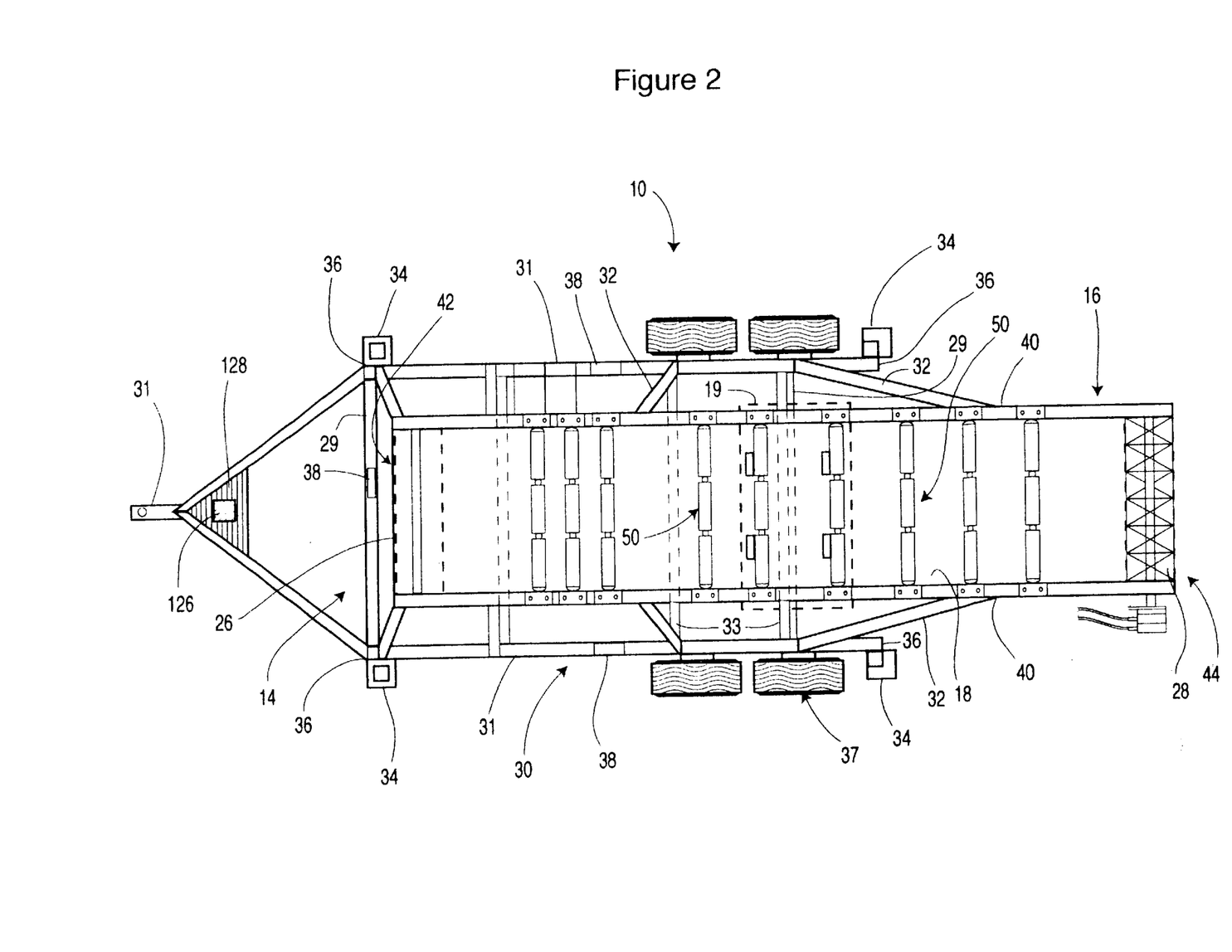
FIG. 2 is a plan view of FIG. 1.

Referring to FIGS. 1 and 2, a conveyor system 10 includes a platform 14 supporting a conveyor flame 16 on a series of frame supports 32, which fixedly maintain a predetermined angle 8 of the conveyor frame 16 relative to the platform 14. The platform is supported on a ground surface 12 by a pair of wheels 37 and platform supports 34. Disposed around the conveyor frame 16 is a continuous conveyor belt 18, which rotates during operation of the system 10 to transport a bulk material 21 from an inlet end 42 to a discharge end 44. Mounted at the inlet end 42 is a hopper 17, which directs the bulk material 21 from a holder (not shown) onto the rotating belt 18. A weigh station 19 is positioned on the conveyor frame 16 to weigh the bulk material 21 as it is transported on the conveyor belt 18. The weigh station 19 is described in more detail below.

The belt 18 is rotated by a frictional engagement between the belt 18 and an outer surface of a drive pulley 28, which is driven by a drive system 24 mounted on the platform 14. An idler pulley 26 is mounted at the inlet end 42 and is used to adjust the tension of the conveyor belt 18, which will be described later.

The belt is supported by the platform 14 which includes a planar base 30 consisting of a pair of ends 29, a pair of sides 31, and a series of structural support members 33. The frame supports 32 project substantially upward from the base 30, extend between the platform 14 and frame 16, and are securely connected thereto. The platform supports 34, such as a series of leveling jacks, are positioned adjacent to each corner 36 of the base 30. A series of bubble levels 38 are positioned on the sides 31 and the ends 29 of the base 30 to assist in leveling of the platform 14, by the supports 34, into a true horizontal orientation. This helps to ensure that an inclination between the plane the conveyor frame 16 and a level plane is the same, irrespective of the nature of the ground surface 12 upon which the system 10 is situated.

Figure 3:
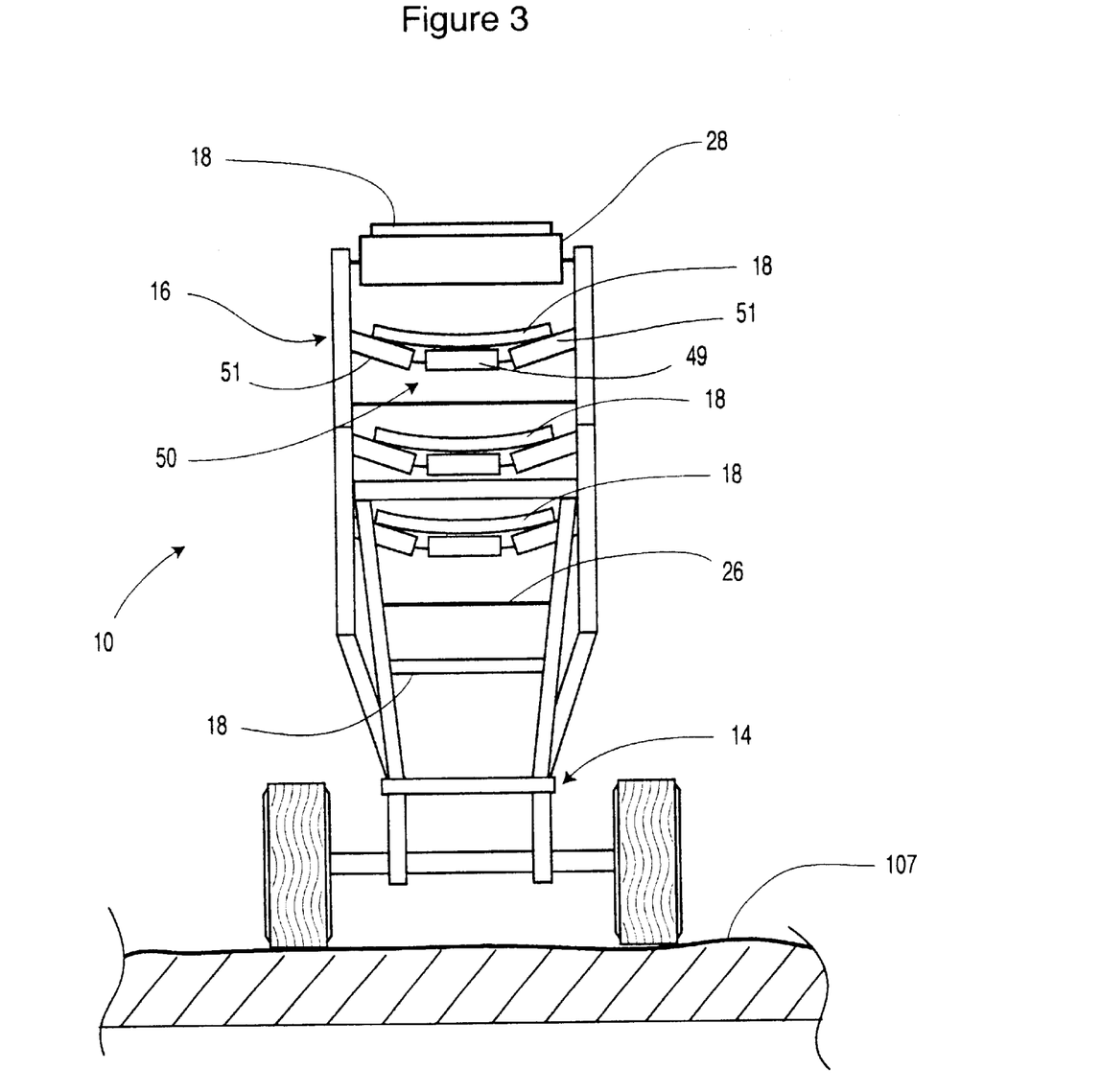
FIG. 3 is an end view of FIG. 1.

The conveyor frame 16 includes a pair of side rails 40, a top surface 46, and a bottom surface 48. A plurality of support roller assemblies 50, comprising rollers 49 and 51 shown in FIG. 3, are distributed in a spaced apart parallel relationship on the top surface 46 between the pulleys 26 and 28, along the longitudinal axis 52. The pair of side support rollers 51, shown in FIG. 3 are place in an angled orientation with respect to each of the support rollers 49 on either side thereof. This arrangement of support rollers 49, 51 causes the belt 18 to have a generally concave shape and inhibits the bulk material 21 from falling off the rotating belt 18.

As shown in FIG. 3, it is preferable to orient the support roller assemblies 50 perpendicular to the longitudinal axis 52 of the conveyor frame 16 to inhibit travel of the belt 18 transverse to the longitudinal axis 52 during operation of the system 10. Distributed on the bottom surface 48 of the conveyor frame 16, shown in FIGS. 1 and 2, is a series of return rollers 54, where-between the belt 18 is directed, whereby a tension of the belt 18 is maintained and a linear speed measured thereof.

Figure 4:
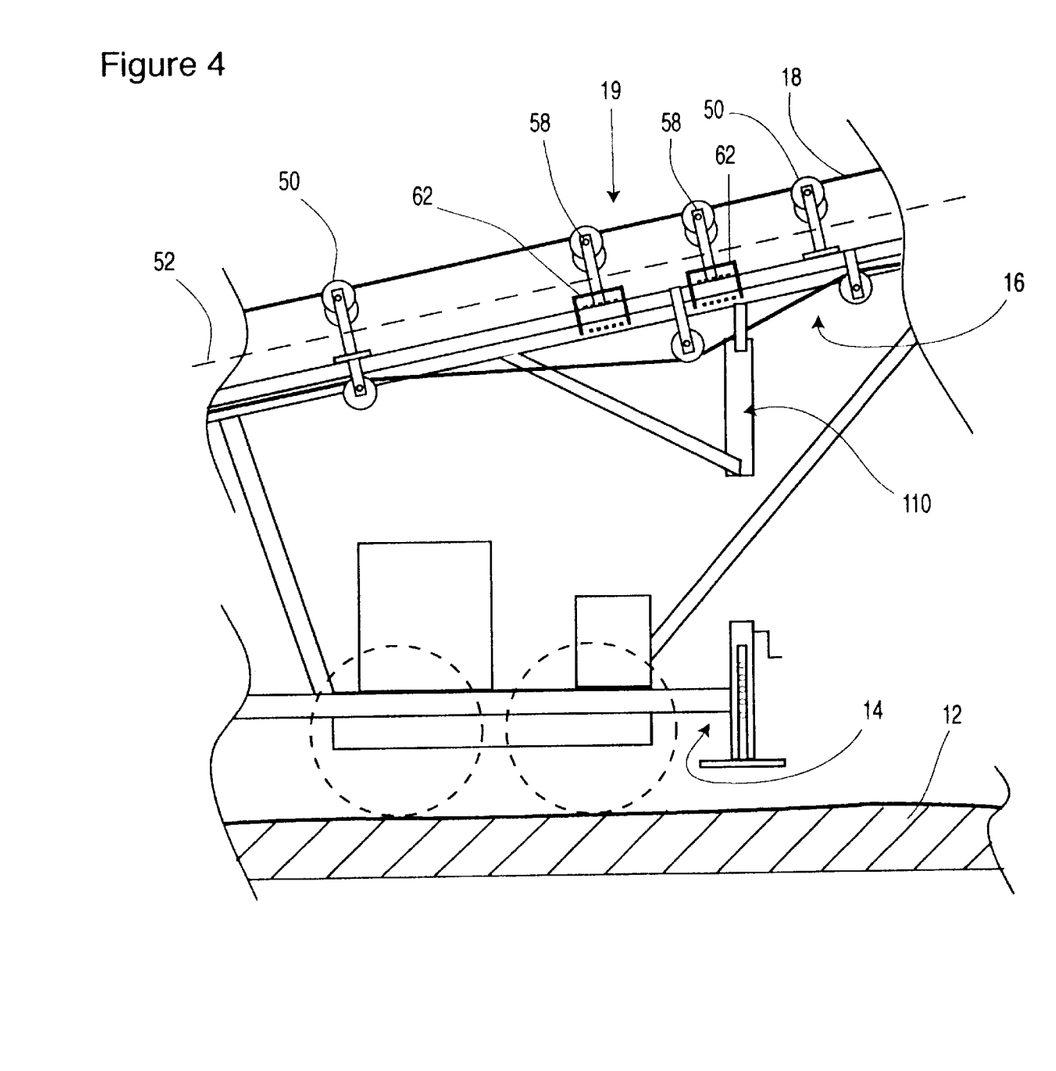
FIG. 4 is a side view of a weigh station of FIG. 1.

The weigh station 19 situated on the conveyor frame 16 shown in FIG. 4, includes a pair of weigh rollers 58 spaced apart in a parallel relationship to one another, and oriented perpendicular to the longitudinal axis 52. The pair of weigh rollers 58 is generally positioned centrally on the conveyor fame, between a pair of adjacent support roller assemblies 50, and is supported by a pair of corresponding weigh scales 60. The weigh scales 60 can be protected from damage due to foreign matter by protective covers 62, if desired. A computer station 110 is connected to the return rollers 54 and the weigh scales 60 to record and indicate, to a user of the system 10 various parameters of the system, such as belt speed, belt tension, and weight of the bulk material 21.

Figure 12:
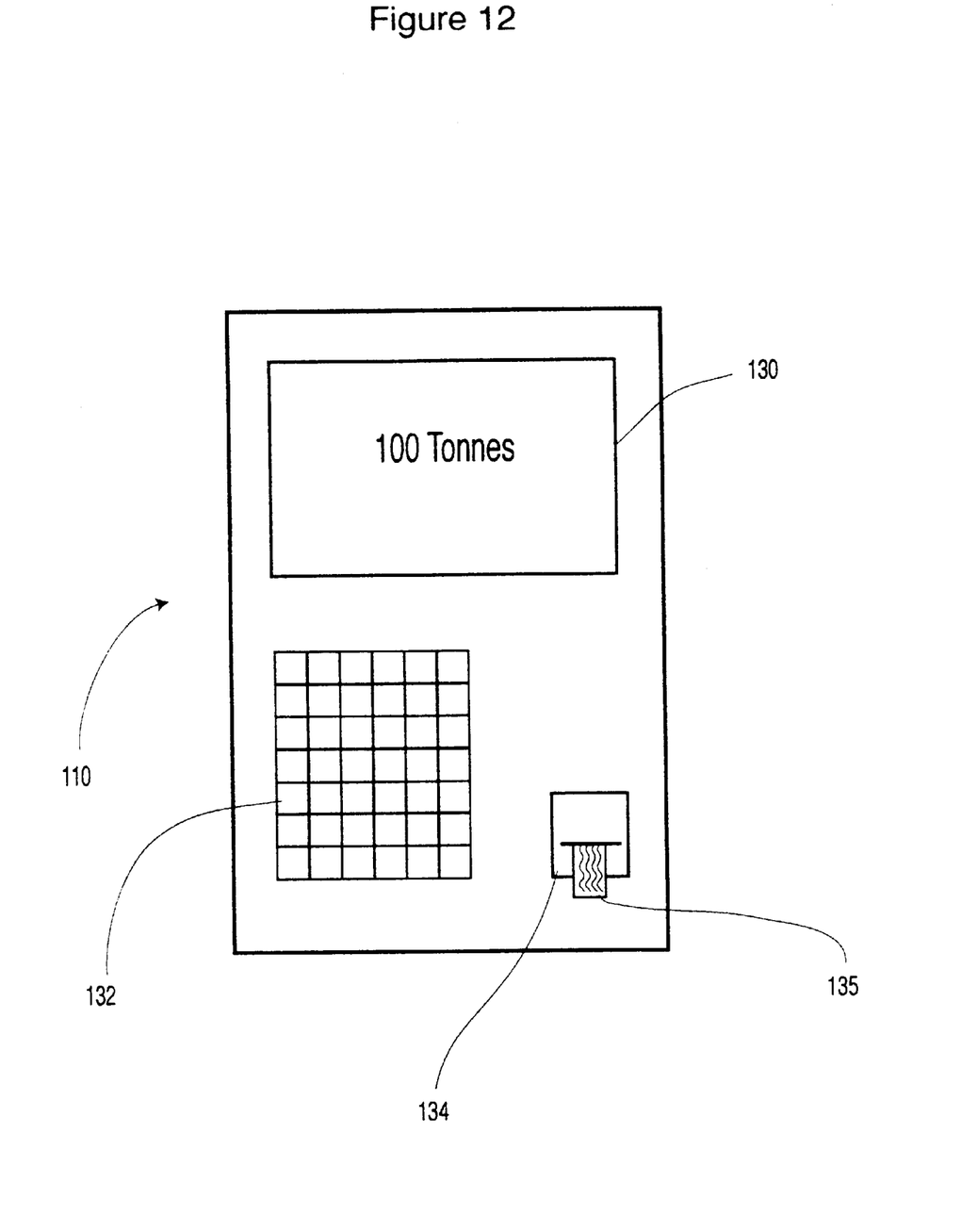
FIG. 12 shows the components of the computer station.

As shown in FIG. 12, the computer station 110 includes a display 130 to the desired load parameters. An input device such as a keyboard 132 is provided to configure the output parameters on the display 130. Additional information can be entered into the computer station 110 via the keyboard 132 such as physical charactertics of the bulk ralial 21, as well as particular load characteristics such as transport truck identification and other desired log information. A printer 134 allows the computer station 110 to issue certified tickets 135 indicating desired load parameters such as time, date, type of material, load weight, customer I.D., location, and transport truck identification. The printer 134 can also be used to generate logs after a certain specified interval, such as daily or weekly.

Figure 5:
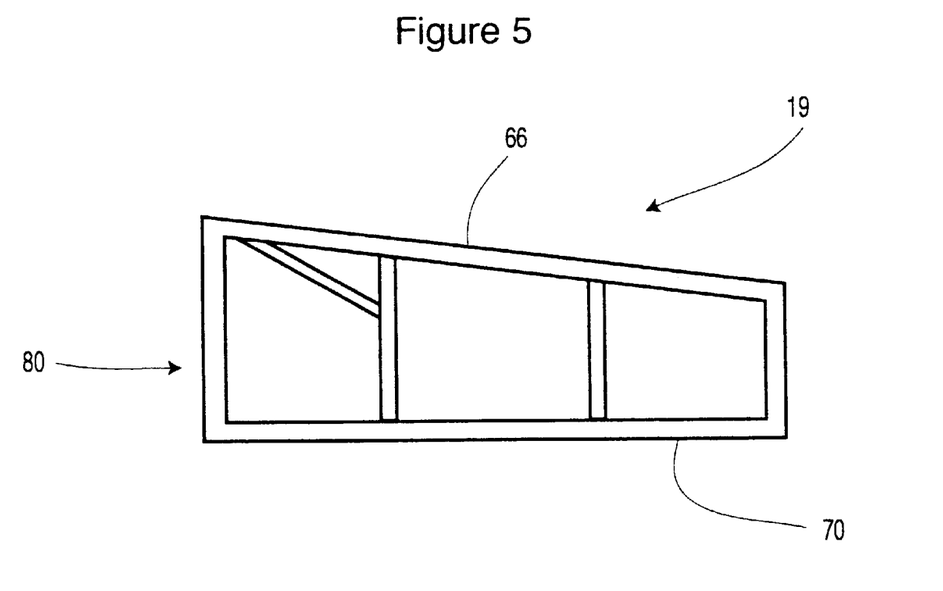
FIG. 5 is a side view of a hopper frame shown in FIG. 1.
Figure 6:
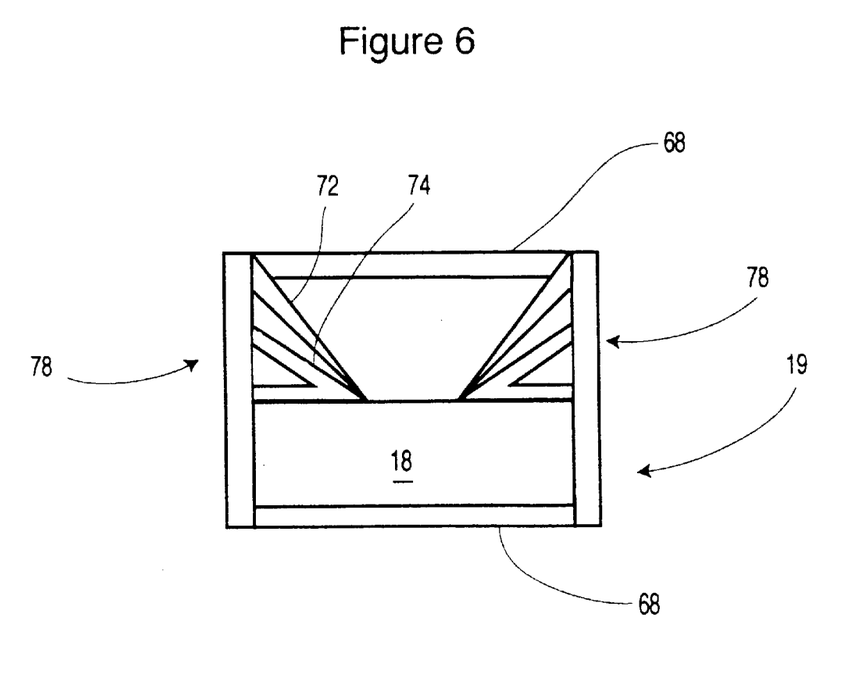
FIG. 6 is an end view of FIG. 5.

The bulk material 21 is loaded onto the belt 18 in a controlled manner by means of the hopper 17, located at the inlet end 42 of the conveyor frame 16. The hopper frame, shown in FIGS. 5 and 6, is fastened to the conveyor frame 16 and includes a pair of top rails 66, a series of end rails 68, and a pair of bottom rails 70. The geometrical shape of the frame 19 is a trapezoidal prism, but other frame shapes may also be used if desired. A series of angled members 72, 74 on the fame 19 are used to funnel the bulk material 21 from a material source (not shown), such as a crusher, onto the belt 18. A wire mesh 76, shown in FIG. 1, may encase the side surfaces 78 and end surface 80 of the hopper frame 19 to protect an operator (not shown) during use of the conveyor system 10. Other sections of the conveyor system 10 may be encased by the mesh 76, if desired.

Figure 7:
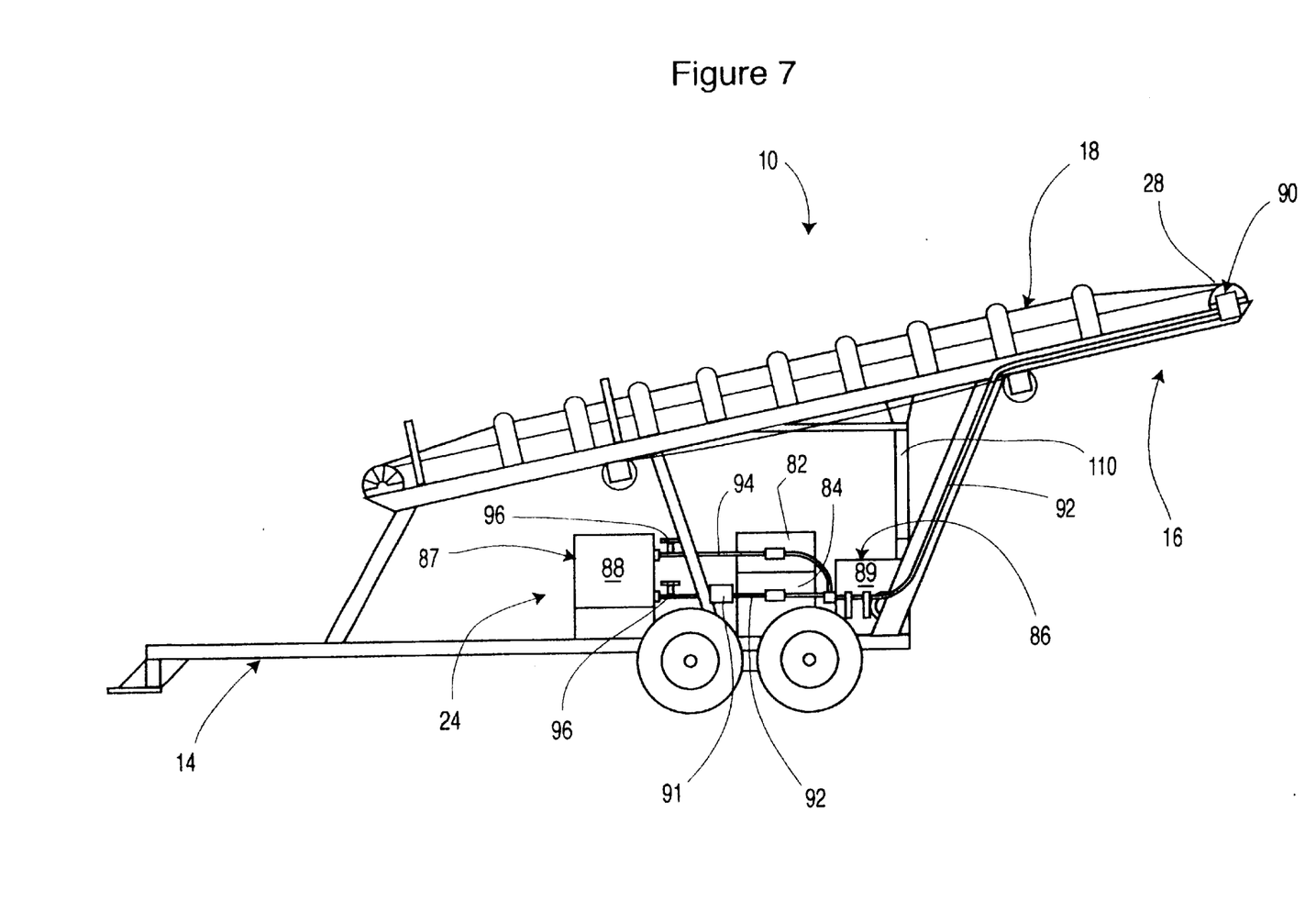
FIG. 7 is a side view of the drive system of FIG. 1.

The drive system 24, shown in FIG. 7, is employed to displace the belt 18 along the longitudinal axis 52. The system 24 comprises a fuel driven motor 82 to drive a hydraulic pump 84, and a reservoir 87 to supply hydraulic fluid 88 to the pump 84, all of which are mounted on the platform 14. An oil filter 91 is positioned between the pump 84 and the fluid reservoir 87. A series of hydraulic lines 92 connect the pump 84 with a hydraulic motor 90, which is attached to the drive pulley 28. A fuel tank 86 is mounted on the platform 14 and is connected to the motor 82 by a series of fuel lines 94. A number of valves 96 may be positioned in the lines 92, 94 to restrict the flow of fuel 89 and fluid 88 when the conveyor system 10 is not in use.

Figure 8:
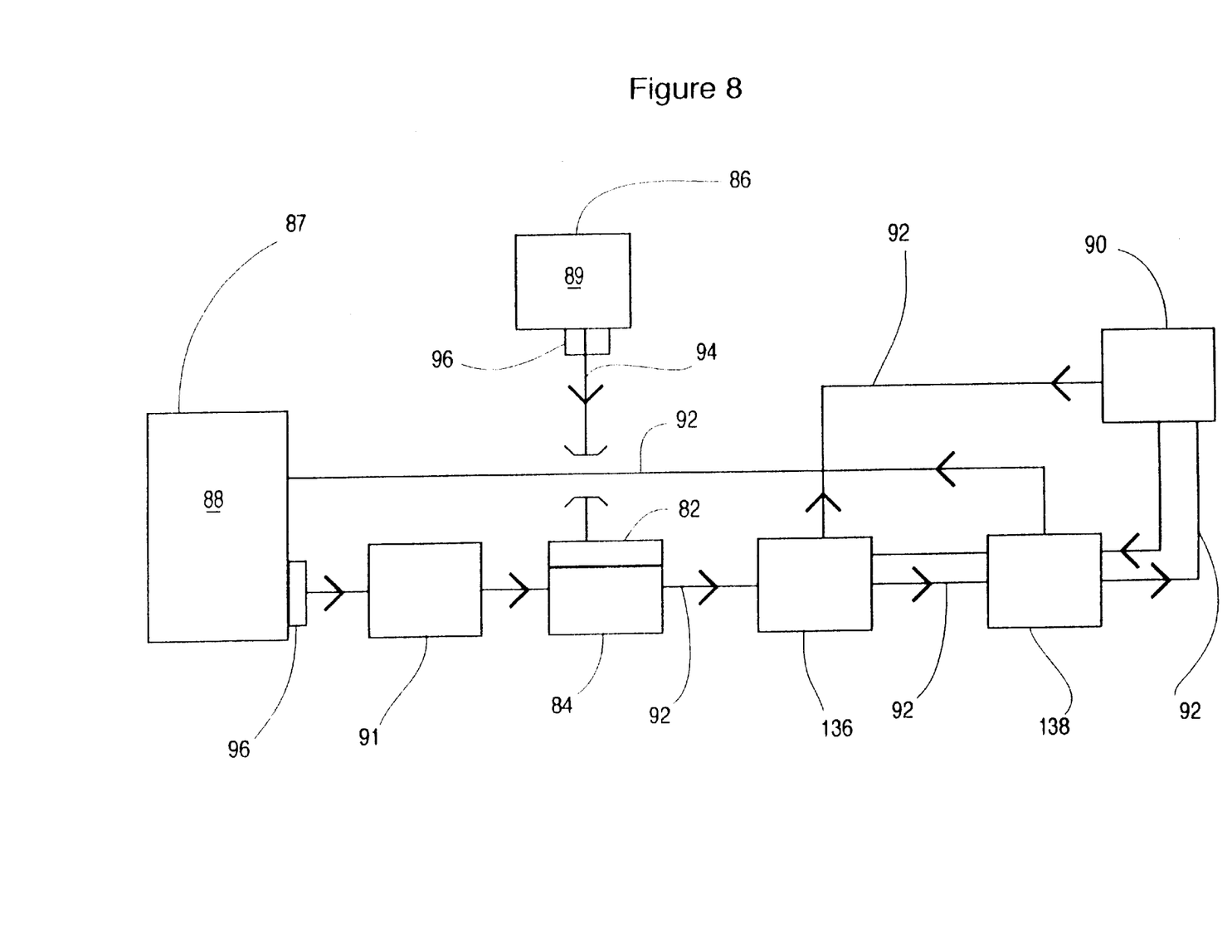
FIG. 8 is a flow chart of the drive system of FIG. 7.

A flow chart, shown in FIG. 8, demonstrates the interconnections between the components of the drive fuel system 24. In operation of the drive system 24, a flow control unit 136 is employed to control the speed of the hydraulic motor 90. A valve bank 138 is positioned between the pump 84 and motor 90 to control the direction of rotation thereof Drive system configurations other than shown may also be used, if desired.

Figure 9:
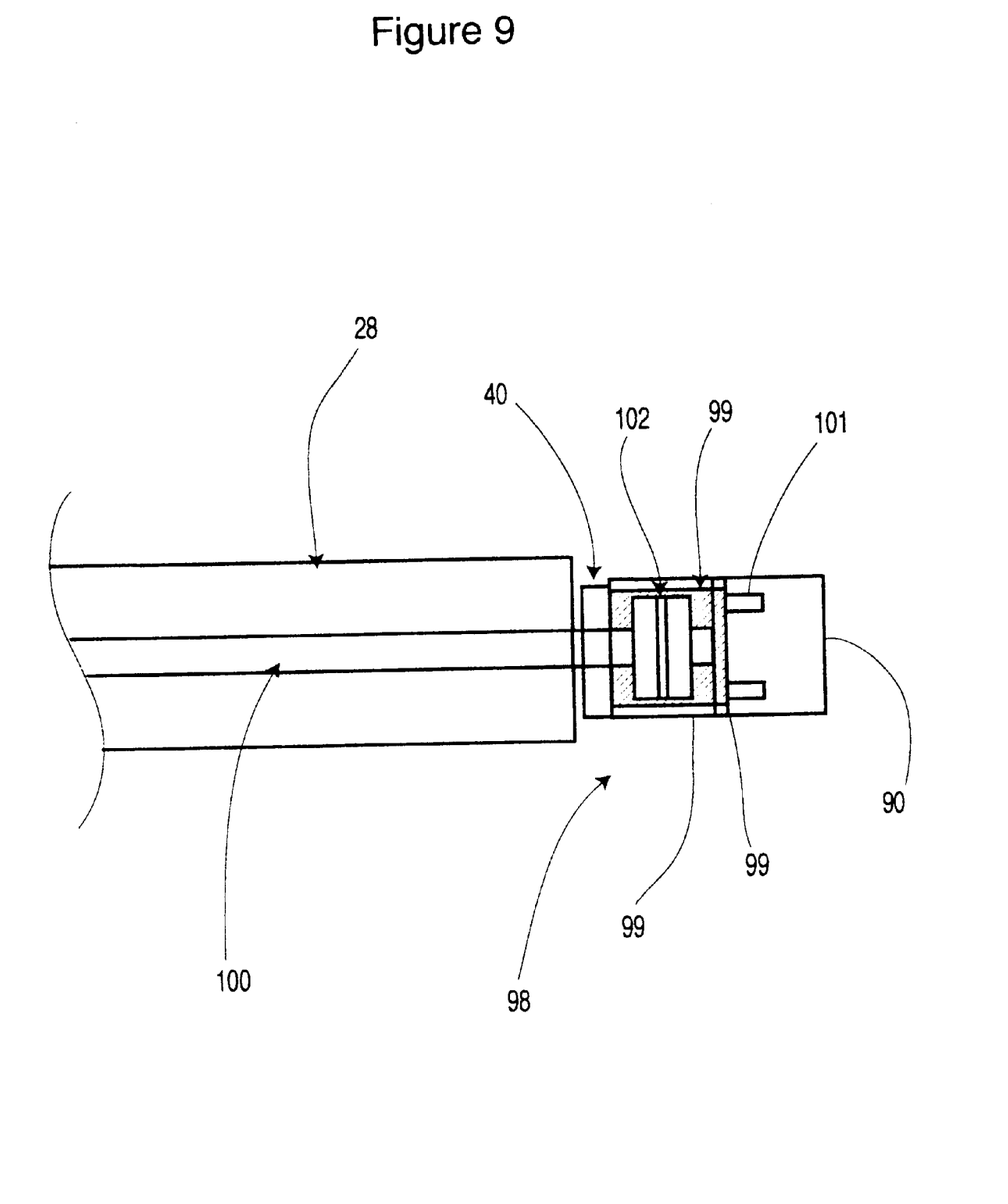
FIG. 9 shows the connection between the drive system and the drive pulley of FIG. 1.

In the preferred embodiment shown in FIG. 9, a mount 98 is used to mount the hydraulic motor 90 to the conveyor frame 16. The mount 98 is comprised of a series of rigid plates 99, preferably made of steel or aluminum. The hydraulic motor 90 is mounted squarely to the motor mount 98, preferably with bolts 101. The drive pulley 28 is mounted on a motor shaft 100 and an energy absorbing bushing 102, preferably made of rubber or the like, is positioned between the side rails 40 and the plates 99. If the plates 99 are not rigid, the body of the motor 90 may vibrate and cause the bushings 102 to disintegrate during operation of the bolt 18.

Figure 10:
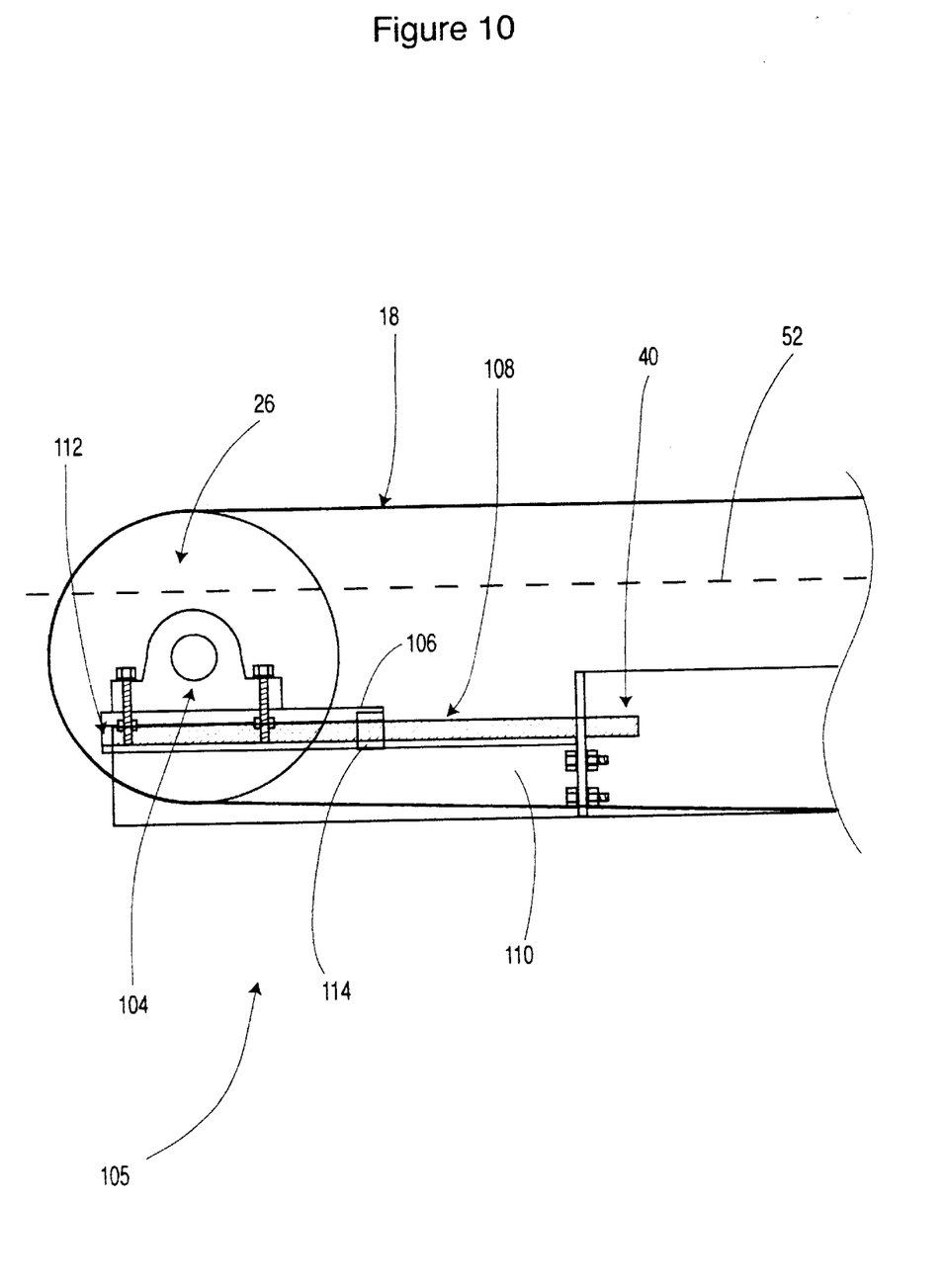
FIG. 10 is a side view of a pulley tension adjustment system.

As can best be seen in FIG. 10, a belt tensioning system 105 is mounted on the conveyor frame 16 at the inlet end 42. The idler pulley 26 is positioned between a pair of bearings 104, which are each mounted to a corresponding slider plate 106. The tension of the conveyor belt 18 is adjusted by displacement of the pair of slider plates 106 along the longitudinal axis 52 by a pair of corresponding threaded rods 108. The slider plates 106 are moveably attached to a pair of extensions 110, mounted to either side of the side rails 40. A nut 112 is welded to one distal end of each of the rods 108 and a slide adjustment 114 is positioned on each of the rods 108 to releasably secure a predetermined longitudinal position of the slider plate 106. A correct tension of the moving belt 18 is critical to the measurement of the speed thereof by the return rollers 54. The belt must not have any discernable sag and in trial operation of the preferred embodiment of the invention, a belt tension value of 4 pounds per inch was deemed satisfactory. Belt tensioning systems 105 other than that shown in FIG. 10, such as all manner of springs and other threaded arrangements may be employed, if desired.

In order to operate the conveyor system 10, it is first transported to a desired location and the height of the discharge end 44 is adjusted using the jacks 34. The wheels 35 are preferably raised off of the ground surface 12 during the leveling procedure. The bubble levels 38 may be used to ensure the plane of the base 30 is in a horizontal orientation. Next, the taps 96 are opened and the motor 82 is started. The motor 82 drives the pump 84, whereby the hydraulic motor 90 and the drive pulley 28 are rotated. The outer surface of the pulley 28 engages the conveyor belt 18 and causes the belt 18 to travel along the longitudinal axis 52.

The hopper 17 facilitates placement of the bulk material 21 onto the moving belt 18 at the inlet end 42. The bulk material is subsequently transported, between the side rails 40, towards the discharge end 44. As the bulk material 21 travels the linear distance between the rotational axis of adjacent weigh rollers 58, the weight of the bulk material 21 per the linear distance is measured by the scales 60. The linear speed of the belt 18 is measured by the return rollers 54 and parameters such as the mass flow rate of the bulk material 21 is subsequently calculated and indicated by the computer station 110. A certified printout can be obtained from the printer 136 if desired.

The return rollers 54 are preferably solid and perfectly round to provide accurate speed measurement of the belt 18. The rollers 54 are preferably coated with a fluro-carbon resin, such as Teflon or the like, to inhibit foreign matter from adhering to the outer surface of the rollers 54. The rollers 54 are dimensioned 5 inches in diameter by 42 inches in length, and are a product of Assinck Bros. (Markham, Ontario). The weigh rollers 58 are provided by Milltronics Peterborough, Ontario) and are also preferably coated with a fluro-carbon resin, such as Teflon or the like. The support rollers 49, 51 of the support roller assembly 50 are dimensioned 5 inches in diameter by 13 inches and angled at 35 degrees, and are supplied by Assinck Bros., with a part number Ab25535s36. The rollers 49, 51 are perfectly round to enable the belt 18 to follow a substantially straight path along the longitudinal axis 52. The drive pulley 28 and the idler pulley 26 each are dimensioned 12 inches in diameter by 36 inches in length, both are supplied by Assinck Bros., with part numbers d12c38xt25 and w12c38xt25 respectively. All of the rollers 54, 50, 51, 58 and pulleys 26, 28 are preferably mounted on the conveyor system 10 with threaded fasteners, such as bolts or the like, through their respective rotational axii.

The weigh scales 60 are supplied by Milltronics, model Compuscale III N4 115 volts. The hydraulic motor 90 is supplied by CTI (Brampton, Ontario), part number 8010106. The motor 82 is a 25 hp Dewitts (Toronto, Ontario) motor and the pump 84 is a 29 gallon Victor (Toronto, Ontario) pump. The hydraulic fid reservoir 87 has a capacity of 90 gallons and the capacity of the fuel tank 86 is 40 gallons.

A different type of support structure 32 to support the conveyor frame 16 on the platform 14 may be other than shown, such as a solid walls. Placement of the jacks 34 and the bubble levels 38 may also be other tan shown, such as on the frame supports 32 or the structural members 33, if desired.

One additional embodiment, shown in FIG. 2, is a set of weights 126 used to calibrate the conveyor system 10, which are positioned adjacent to the trailer hitch 31 to provide tongue weights during transport. These weights 126 are releasably secured to a platform 128 and are meant to be removed before the conveyor system 10 is detached from a transport vehicle (not shown).

Figure 11:
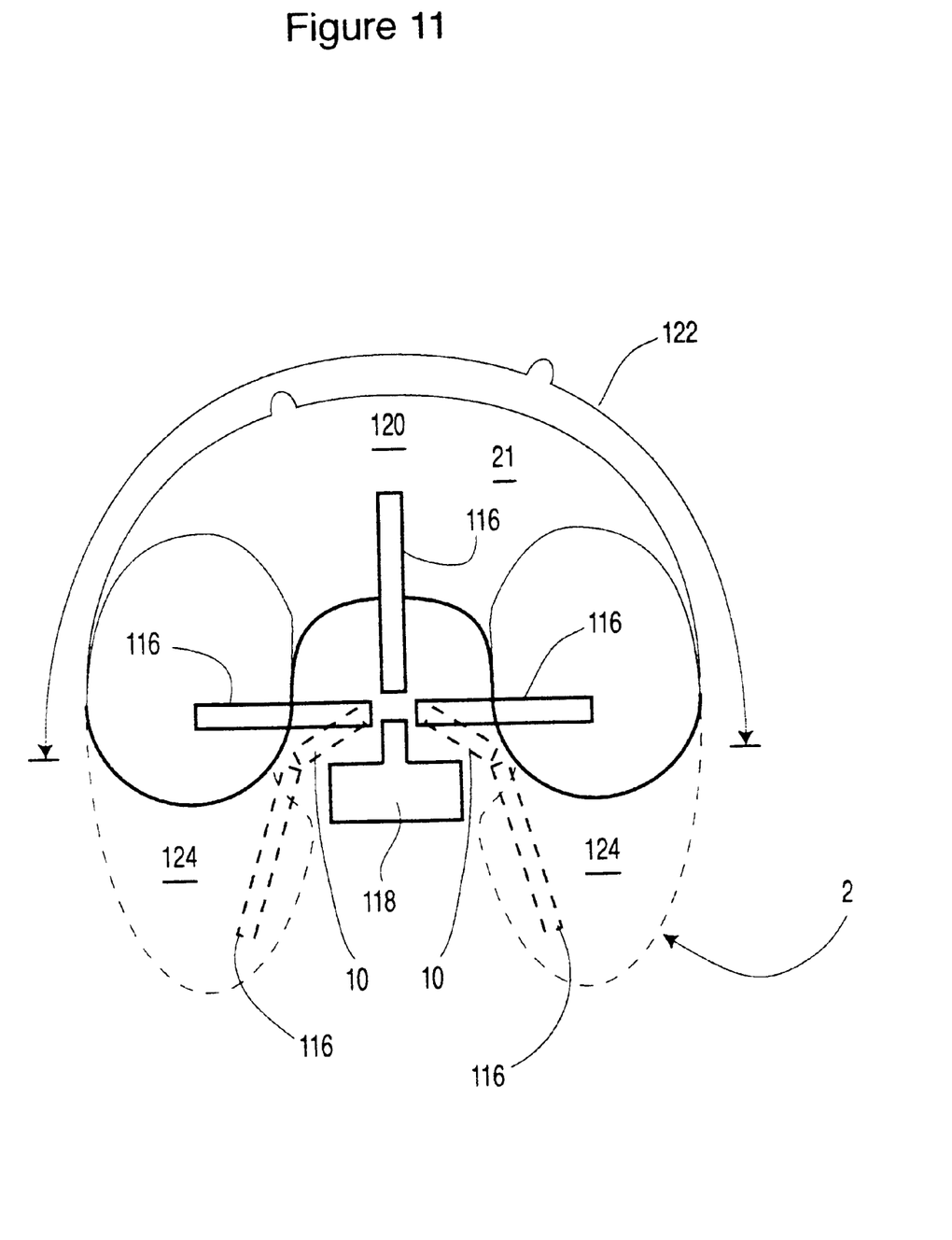
FIG. 11 is a further embodiment of FIG. 1.

In a further embodiment of the invention shown in FIG. 11, the conveyor system 10 is used as a second link between a stacker 116 and a crusher 118. Typically, the stacker 116 can only deposit crushed material 21 in a series of conical piles 120 in an arc 122, measuring approximately 180°, in front of the crusher 118. Once an area defined by the arc 122 is piled to capacity, additional material 21 can only be piled typically after the crusher 118 is moved further from the piles 120. As demonstrated by the dashed lines, the conveyor system 10 can act as a second link between the crusher 118 and stacker 116 to enable a wider distribution 124 of the piled material 21, without moving the crusher 118. A further benefit of using the system 10 as a second link is that a substantially accurate measure of the weight of the crushed material 21 may be obtained, if so desired.

In the preferred embodiment the spacing between the adjacent support roller assemblies 50; the spacing between the adjacent weigh rollers 58 and support roller assemblies 50; the magnitude of the fixed angle of the conveyor frame 16 relative to the platform 14; the linear speed of the belt 18; the perpendicular positioning of the roller assemblies 50, the weigh rollers 58, and the return rollers 54; all affect, in combination, the weighing accuracy of conveyor system 10. It is the integral combination as a single portable unit, including the above listed attributes, which make the conveyor system 10 a potentially certifiable product. The specific dimensions of the above mentioned roller spacings are given by way of example only and it is recognized that other combinations thereof may be possible without departing from the spirit and scope of the invention.

By having a predetermined conveyor angle and self contained power and measurement means the apparatus of the present invention provides reliable and reproducible results.

While only specific combinations of the various features and components of the present invention have been discussed herein, it will be apparent to those of skilled in the art that desired subsets of the disclosed features and components and/or alternative combinations of these features and components can be utilized, as desired, as outlined in the claims appended hereto.

The embodiments of the invention in which an exclusive property or privilege is claimed are defined as follows:

1. A conveyor system for simultaneously conveying and weighing a bulk material comprising: a frame; at least one continuous conveyor belt positioned on said frame, a drive system mounted on said frame to rotate said belt; and a plurality of frame rests to support said frame relative to a ground surface; said frame including a first portion and a second portion; said frame second portion including a support frame, a plurality of support roller assemblies and a plurality of return rollers transversely situated on said support frame in a spaced apart parallel relationship, a weight station located on said support frame and between a pair of said support roller assemblies between an inlet end and a discharge end, and a drive pulley located at one of said ends and an idler pulley located at another of said ends; said conveyor belt disposed around said support roller assemblies, said weight station, said idler pulley, said drive pulley, and said return rollers; said first portion of said frame including a generally planar base, a plurality of frame supports projecting substantially upwards from said base and connected to said second portion; wherein all of the components of said conveyor system are integrated as a single unit and said conveyor system is portable; said weigh station is centered between said pair of adjacent said support roller assemblies and includes at least two corresponding weigh scales spaced apart for measuring the weight of said bulk material per linear distance; two spaced apart weigh rollers in a parallel relationship to one another and perpendicular to said side rails; and said weight rollers are mounted on said weigh scales.

2. The conveyor system according to claim 1, wherein said spacing between each rotational axis of adjacent said weigh rollers is 28.5 inches, said spacing between each rotational axis of adjacent support rollers is 28 inches, and said spacing between each rotational axis of an adjacent said support roller and said weigh roller is 28 inches.

3. The conveyor system according to claim 1, wherein said second portion of said frame is inclined at a predetermined fixed angle relative to said first portion of said frame.

4. The conveyor system according to claim 3, wherein said inclined angle is in the range between 5° and 20°.

5. The conveyor system according to claim 4, wherein said angle is about 11°.

6. The conveyor system according to claim 1, wherein some of said frame rests comprise a plurality of adjustable jacks to permit variation in a height of said conveyor system, whereby a leveling of said base is achieved.

7. The conveyor system according to claim 6 further comprising a plurality of bubble levels located on said base of said frame to assist in said leveling of said base by said jacks in both planar directions.

8. The conveyor system according to claim 1, wherein some of said frame rests comprise a pair of wheels attached to said base to facilitate mobility and transport of said conveyor system.

9. The conveyor system according to claim 1 further comprising at least one displacement mechanism for said pulleys, whereby a tension of said conveyor belt is adjusted by displacing and releasably fixing in position at least one of said pulleys along a longitudinal axis of said second portion of said frame.

10. The conveyor system according to claim 1, wherein an outer surface of each weigh roller in said weigh roller assemblies include a surface treatment to inhibit an adhesion of foreign material thereto.

11. The conveyor system according to claim 1, wherein said support roller assemblies comprise a series of individual support rollers oriented in a shape of a trough, to inhibit said bulk material from falling off of said belt between said inlet and said discharge end.

12. The conveyor system according to claim 1, wherein said drive system includes a motor coupled to said drive pulley for rotating said belts, and said drive system is located on said frame.

13. The conveyor system according to claim 12, further comprising a transverse calibration device to center on a central axis said transverse placement of said conveyor belt.

* * * * *